Oct. 20, 1953     R. HOFER     2,655,863
TICKET CONTROL APPARATUS
Filed June 24, 1949                                     9 Sheets—Sheet 1
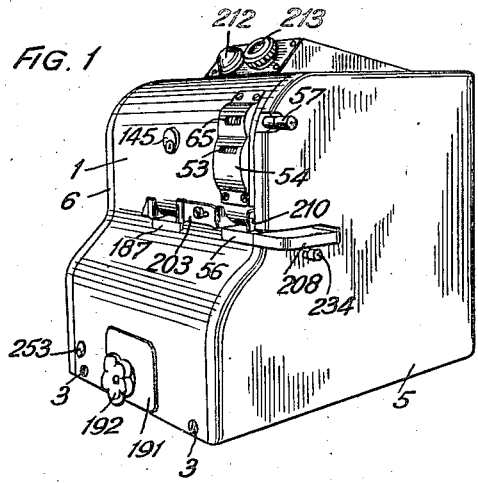
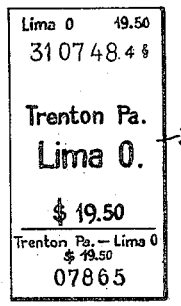
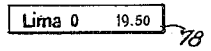
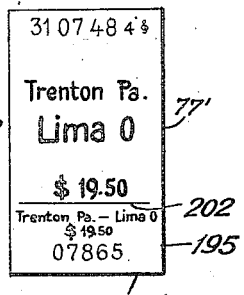
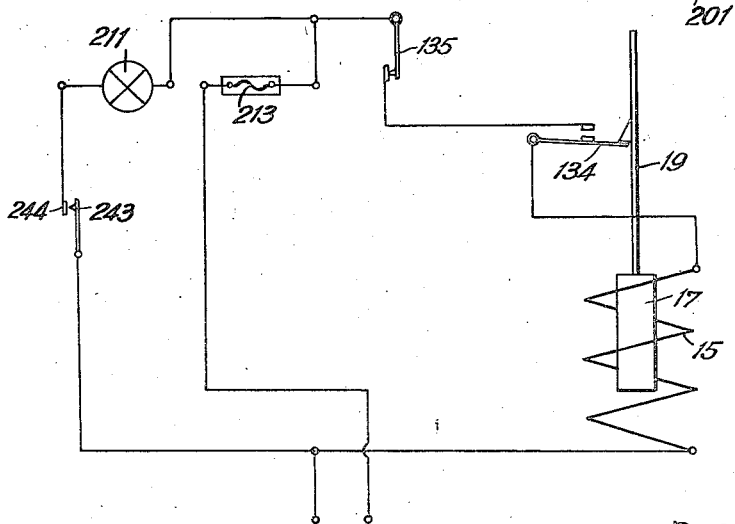
Inventor:
Rolf Hofer
by Sommers & Young
Attorneys

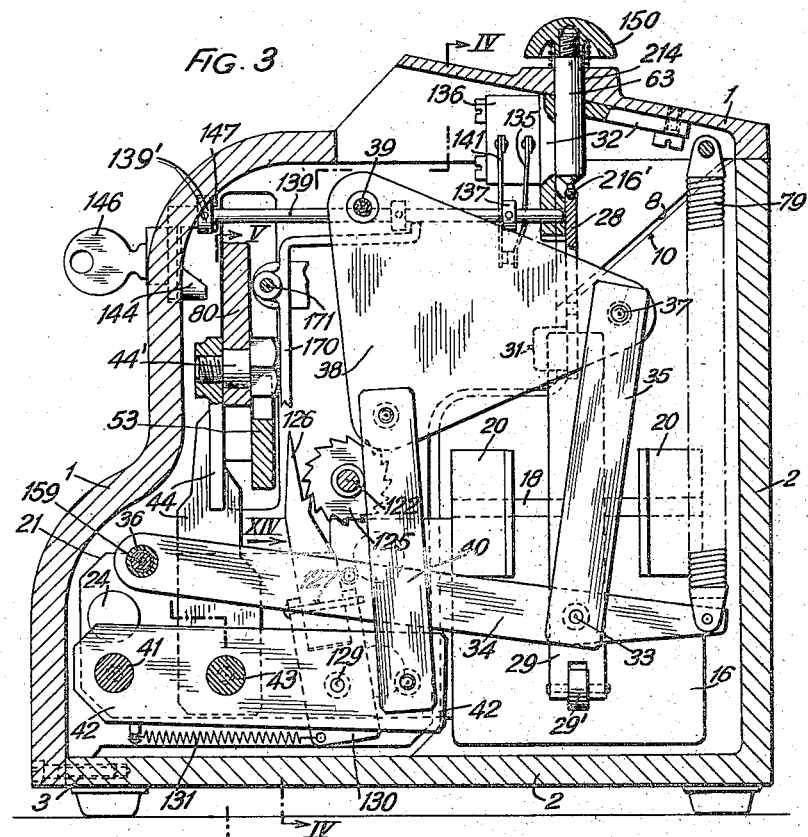

Oct. 20, 1953 R. HOFER 2,655,863
TICKET CONTROL APPARATUS
Filed June 24, 1949 9 Sheets-Sheet 5

Inventor:
Rolf Hofer
by Sommers & Young
Attorneys

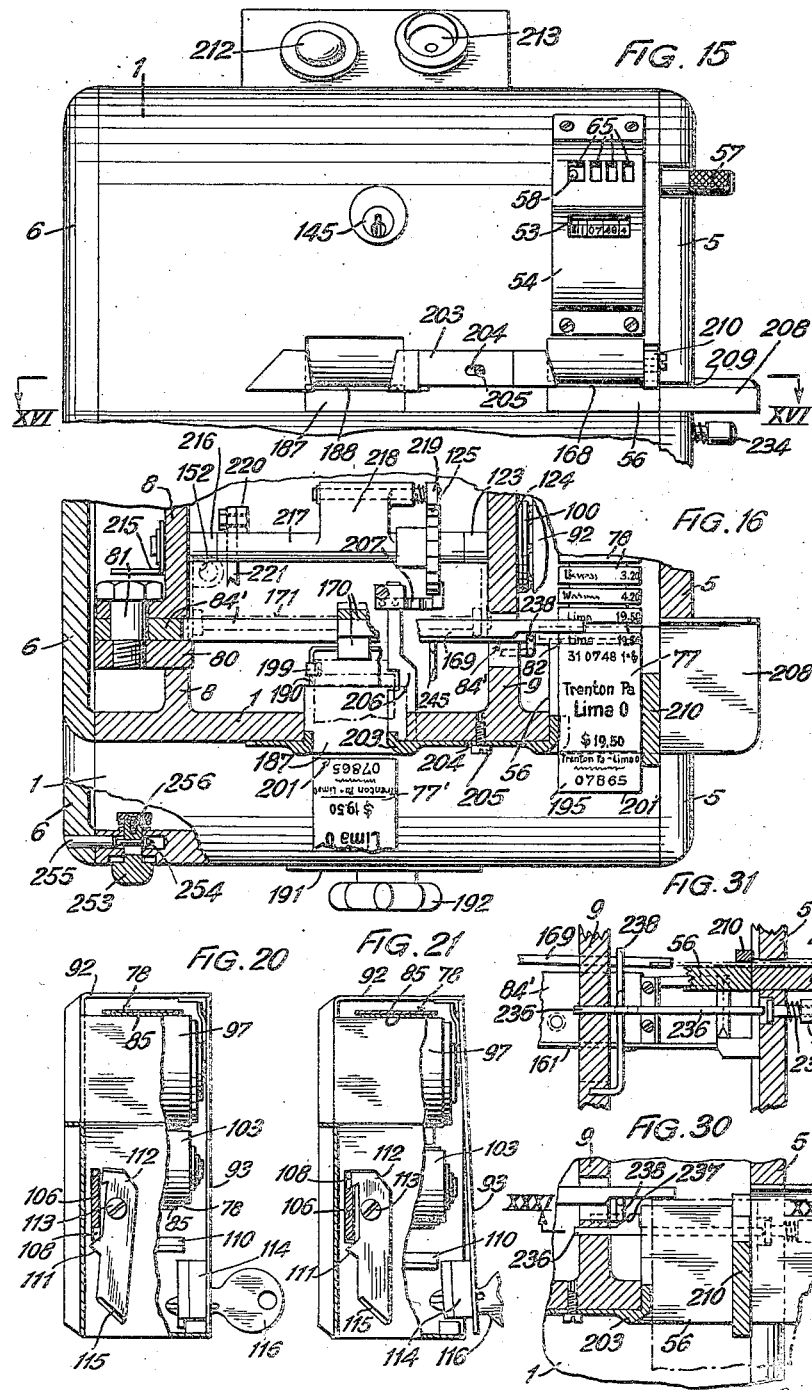

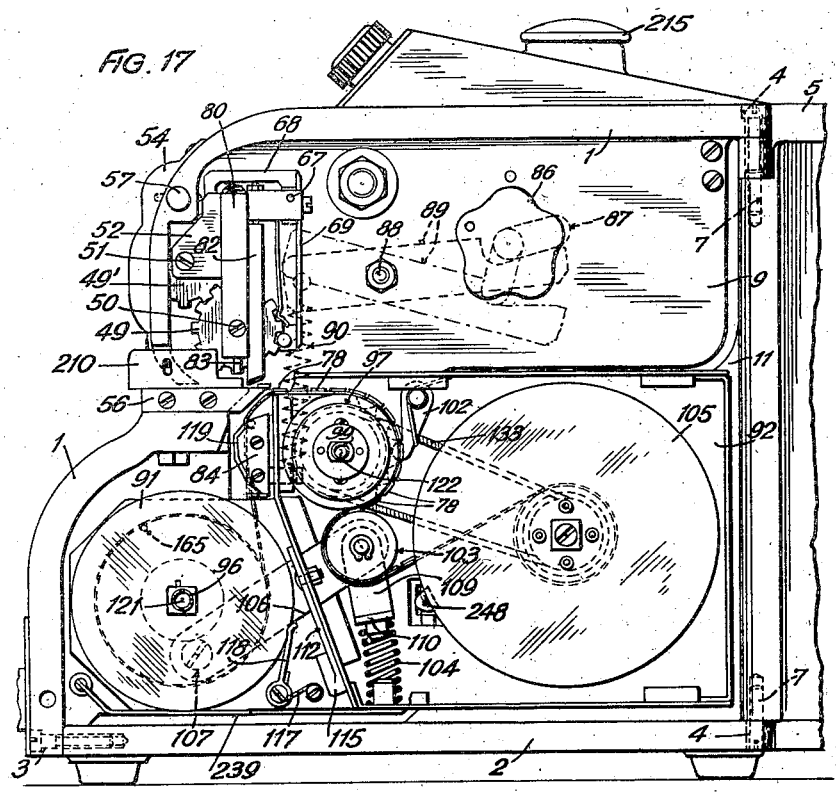

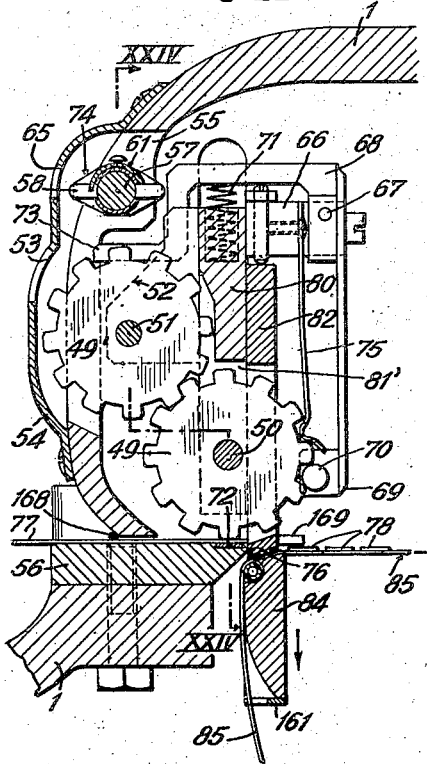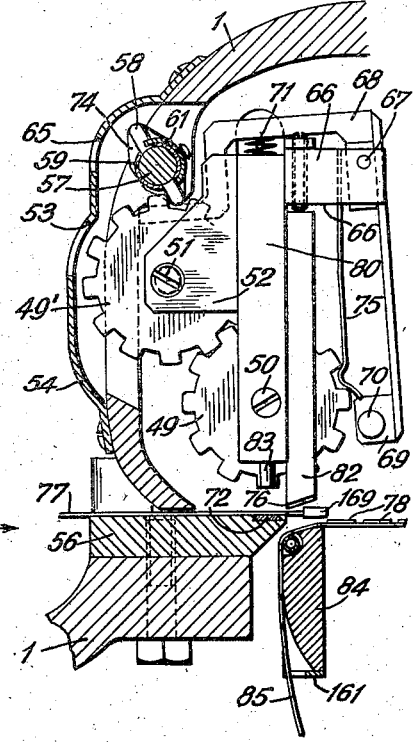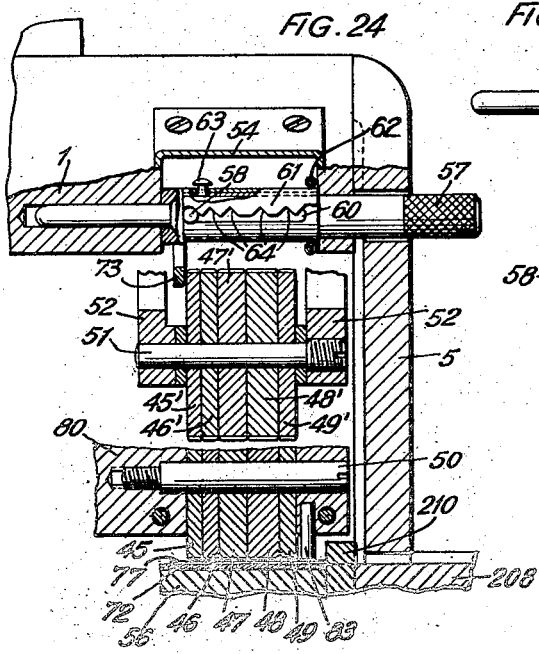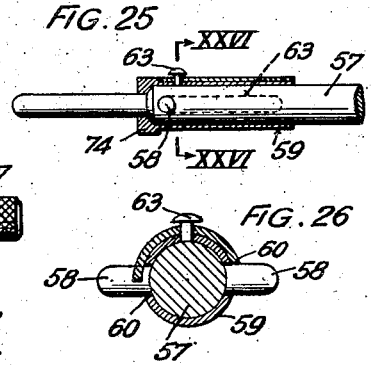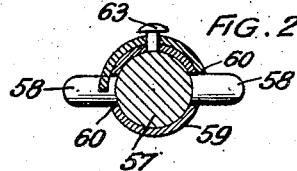

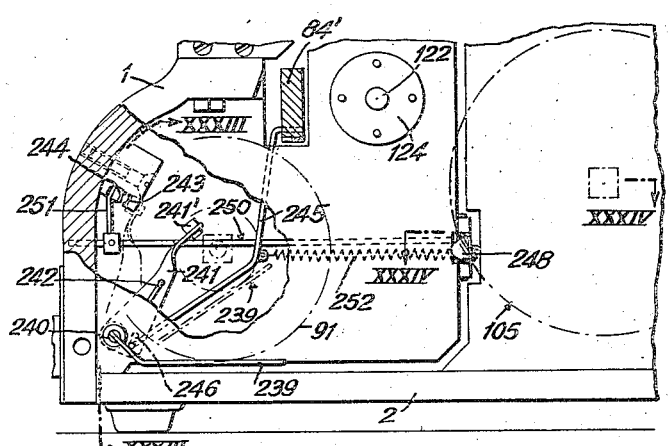
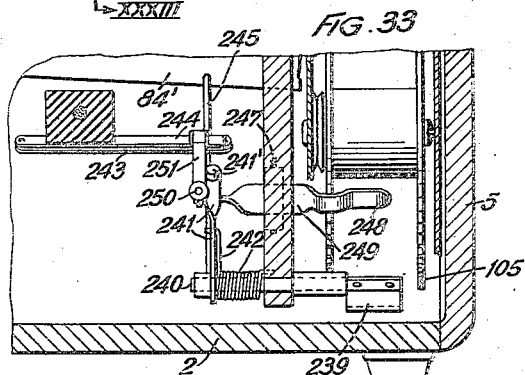
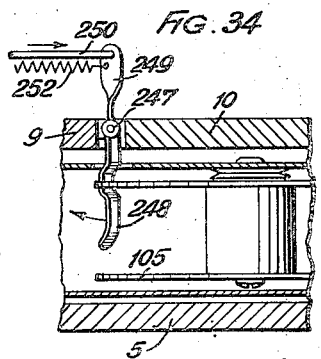
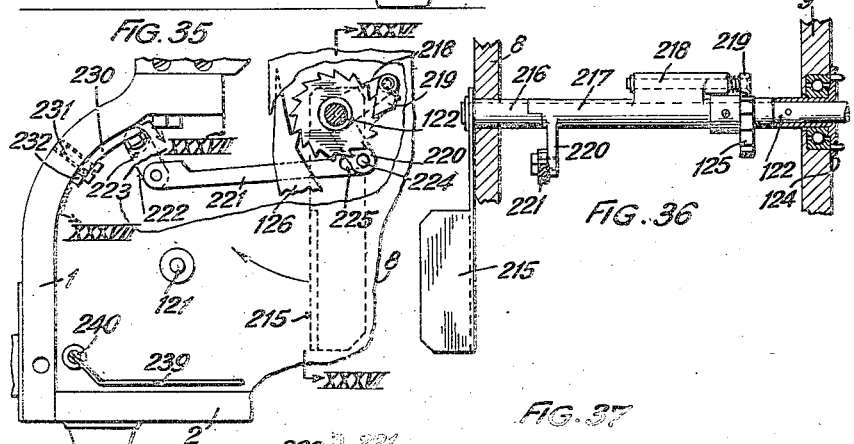
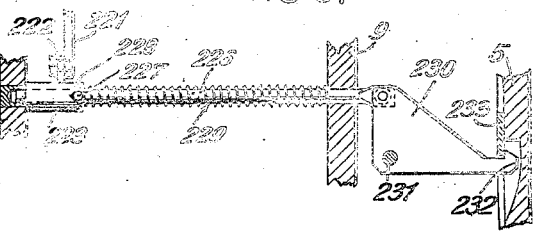

Patented Oct. 20, 1953

2,655,863

UNITED STATES PATENT OFFICE 2,655,863

TICKET CONTROL APPARATUS

Rolf Hofer, Kusnacht (Zurich), Switzerland

Application June 24, 1949, Serial No. 101,157
In Switzerland October 14, 1948

6 Claims. (Cl. 101—69)

This invention relates to ticket control apparatus and more particularly to apparatus destined for controlling the sale of passenger tickets in booking offices of railways or other passenger traffic enterprises. It is important for passenger ticket booking offices to be able to control the sale of pre-printed tickets which are drawn from ticket stocks, and for this purpose to periodically or even daily effect an individual accounting for each of a number of booking clerks of a ticket booking office.

It is an object of the present invention to provide apparatus for controlling tickets to be sold and permitting to effect a periodical, for example a daily individual accounting for each single clerk of a ticket booking office without such apparatus interfering in any way with the rapid sale of tickets.

According to the invention this apparatus comprises means for severing from each ticket to be issued a control stub containing data specific to the issued ticket, means for successively affixing the severed stubs to a tape to form a continuous band, record of the tickets having been issued, and means for advancing the tape, said various means being disposed in a stationary casing and operated by a common driving member.

When the apparatus is used for controlling the sale of passenger tickets, the stub to be severed from the tickets may have the fare charge impressed thereon so that the record tape can be used to ascertain the total amount of money having been received by a booking office clerk.

It is a further object of the invention to provide a ticket control apparatus in which the said tape carrying the control stubs is wound up on a receiving roll enclosed in a locked box or cassette, a separate box or cassette being provided for each booking clerk who operates the apparatus, so that for each clerk an individual record tape is produced, the clerk, at the end of his turn of service removing the box with the wound up record tape carrying the stubs of the tickets which he sold during his turn of service, while the next clerk, at the beginning of his service, introduces his tape carrying box into the apparatus.

A further object of the invention is the provision of electromagnetically operated driving member for simultaneously severing the control stubs from the tickets being issued, affixing the stubs to the tape and stamping or impressing the date and/or other indicia on the ticket.

Various other objects of the invention and features of construction will become apparent from the following detailed description, reference being had to the accompanying drawings representing a preferred embodiment of the invention, more particularly an apparatus for controlling and simultaneously applying the date to railway tickets being issued.

Fig. 1 is a perspective view of the apparatus for controlling railway tickets.

Fig. 2 shows the electrical connections of the driving electro-magnet for the date impressing means, for severing and applying the ticket stubs on the tape and for advancing the tape.

Fig. 3 is a vertical section through the apparatus according to the line III—III of Fig. 4.

Fig. 9 shows a detail drawn to a larger scale.

Fig. 10 shows a part of Fig. 3 in another position of operation.

Fig. 11 is a section along the line XI—XI of Fig. 4.

Fig. 12 and 13 show a safety device in two different positions of operation, in horizontal section along the line XII—XII of Fig. 6.

Fig. 14 shows a detail drawn to a larger scale, viewed in the direction of the arrow XIV in Fig. 3.

Fig. 15 is an exterior view of the upper half of the apparatus

Fig. 16 is a horizontal section along the line XVI—XVI of Fig. 15.

Fig. 17 is a side view of the apparatus having its lateral door opened.

Fig. 18 is a view of the box in which the record tape carrying the cut-off ticket stubs is wound up.

Fig. 19 is a plan view of the box according to Fig. 18, partially shown in section.

Figs. 20 and 21 are transverse sections through the casing along the line XX—XX of Fig. 18, showing the box in closed and in open position, respectively.

Figs. 22 and 23 are vertical sections through the device for impressing the date and severing the ticket stubs showing the device in two different positions of operation.

Fig. 24 is a section along the line XXIV—XXIV of Fig. 22.

Fig. 25 shows the setting member of the date impression wheels.

Fig. 26 is a transverse section along the line XXVI—XXVI drawn to a larger scale.

Fig. 27 represents a so-called Edmonson type railway ticket.

Fig. 28 represents the ticket after a stub has been severed therefrom.

Fig. 29 shows a ticket stub which is severed when issuing the ticket.

Fig. 30 is a fragmentary section along the line XVI—XVI of Fig. 15.

Fig. 31 is a vertical section along the line XXXI—XXXI of Fig. 30.

Fig. 32 is a fragmentary view of the apparatus, the lateral door being open and the tape receiving box removed.

Fig. 33 is a section according to the line XXXIII—XXXIII of Fig. 32.

Fig. 34 is a section along the line XXXIV—XXXIV of Fig. 32.

Fig. 35 is a view in elevation of the apparatus, the lateral door being open and parts broken away to show the ratchet wheel for driving the adhesive tape.

Fig. 36 is a section along the line XXXVI—XXXVI of Fig. 35.

Fig. 37 is a section along the line XXXVII—XXXVII of Fig. 35.

Figure 4:
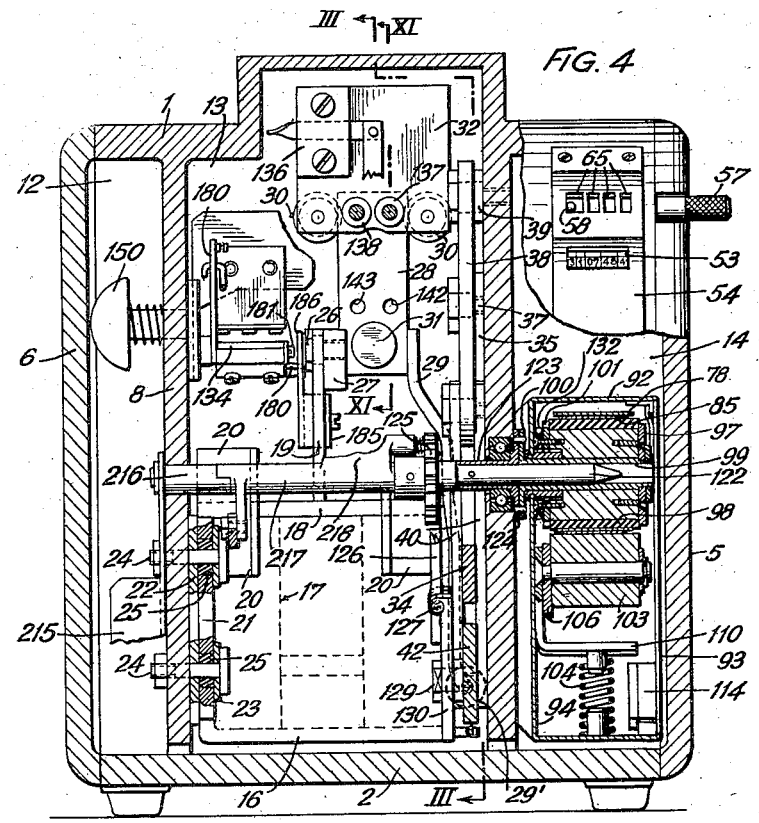
Fig. 4 is a vertical section along the line IV—IV of Fig. 3.

The represented apparatus comprises a casing composed of four portions, a front and upper wall portion 1, a bottom and rear wall 2 which is secured by means of screws 3 and 4 to the wall portion 1, and the two lateral doors 5 and 6 which are hingedly connected to the rear wall 2 by means of journals 7 (Fig. 17) in such manner that the two doors can be swung open laterally. The casing is divided into three adjacent chambers 12, 13 and 14 by vertical partition walls 8, 9 which are integral with the front wall 1, and by vertical partition walls 10, 11 extending in the same plane as the walls 8 and 9 and which are integral with the rear wall of the casing.

Figure 7:
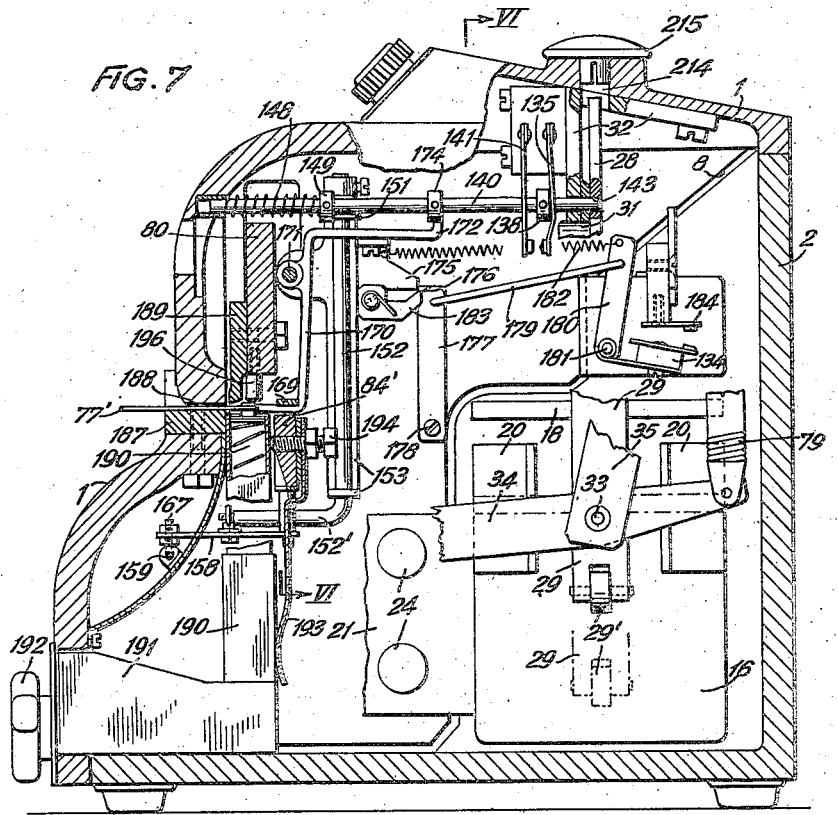
Fig. 7 is a vertical section along the line VII—VII of Fig. 6.
Figure 8:
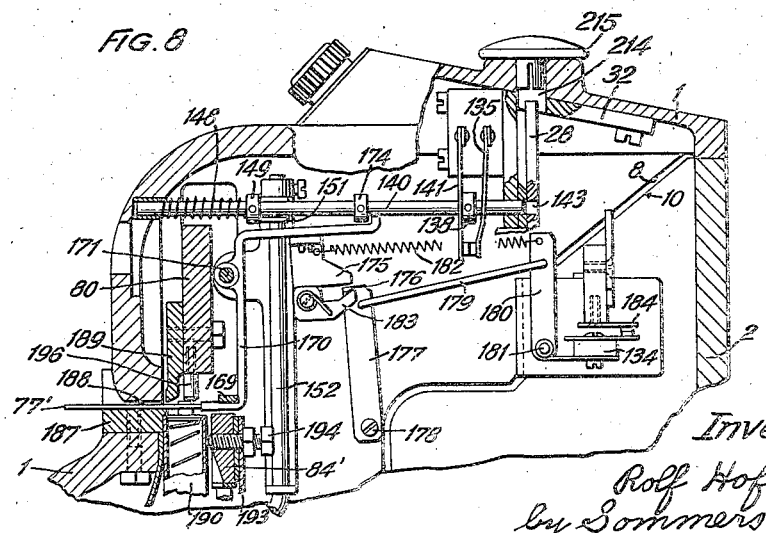
Fig. 8 is a similar section as Fig. 7 and shows parts of the mechanism in another position of operation.

A driving electro-magnet 15 is located in the middle chamber 13 of the apparatus. This magnet comprises a metallic casing 16 (Figs. 3, 4 and 7) which contains a not represented magnet coil and a plunger armature 17 which is shown in Fig. 4 in its lowermost position when the magnet is excited. The armature 17 is rigidly connected to a disc-shaped lid 18 and a pull rod 19. Fig. 7 represents the lid 18 in its uppermost position of rest when the magnet is not energised. The magnet casing 16 comprises metallic flaps 20 extending upwardly beyond the casing and cooperating with the lid 18 in order to increase the attractive force exerted on the lid 18 and the armature 17 at the moment of closure of the magnet circuit. As shown in Figs. 3 and 4 the magnet casing 16 is fixed to the partition wall 8 by means of a flange 21 and screws 24 by the intermediary of insulating washers 22 and 23 and of rubber buffers 25.

The pull rod 19 is secured to a flap 27 of a locking plate 28 by means of a screw 26 which is rigidly connected to a guide rod 29 carrying at its lower end a guide roller 29′ moving in contact with the left hand surface of the partition wall 9. The locking plate 28 is itself guided between two rollers 30 for moving up and down (Fig. 4). The guide roller 29′ and the locking plate 28 guided between rollers 30 allow a free movement of the plunger 17 without any possibility of jamming of the latter. A rubber buffer 31 carried by the plate 28 limits the movement of the armature 17 by abutting in its highest position against the angular plate 32 fixed to the casing portion 1.

A lever 34 and a link 35 (Figs. 3 and 4) are hingedly connected by a journal pin 33 to the guide rod 29 which is operated by the magnet pull rod 19. The lever 34 is rotatably mounted on a plug 36 screwed into the partition wall 9. The link 35 is articulated at 37 to a plate 38 which is pivotally mounted on the pin 39 of the partition wall 9. The plate 38 is connected by means of two links 40 with one end of a driving lever 42 pivoting about the fixed journal pin 41. The lever 42 carries a pin 43 to which is connected the lower end of a pull rod 44 (Figs. 3 and 5) the upper end of which is rotatably connected by means of a screw pin 44′ to a pressure beam 80. The pressure beam is pivotally mounted on the pin 81 carried by the fixed casing. This pressure beam carries the date impression mechanism which will be described hereinafter and the severing knife 82 for severing the ticket stubs from the issued tickets.

When the electro-magnet is energised the armature 17 is pulled into the magnet casing 16 and its downward movement is transmitted by the guide rod 29, the link 35, the plate 38 and the links 40 to the driving lever 42, which in turn acts on the pull rod 44 to swing the pressure beam 80 downwardly. Fig. 3 represents the members transmitting the movements of the armature to the pressure beam when the armature is attracted; the guide roller 29′ is in its lowermost position and the lever 42 and the pressure beam 80 are moved downwardly. When the circuit of the magnet is interrupted, as will be described later, the lever 34 swings upwardly owing to the action of a tension spring 79, the armature 17 being pulled out of the magnet casing 16 by the intermediary of the guide rod 29 and the plate 28, while the link 35, the lever 38 and the links 40 transmit upward movement to the lever 42, so as to return the pressure beam 80 by the intermediary of the pull rod 44 into its position of rest.

The date impressing mechanism (Figs. 22–26) comprises 5 impression wheels 45, 46, 47, 48 and 49 which are rotatably mounted in a recessed portion 81′ of the pressure beam 80 and the severing knife 82, on an arbor 50 carried by the pressure beam. The impression wheels are provided along their circumference with a number of teeth and each impression wheel meshes with a correspondingly toothed setting wheel 45′, 46′, 47′, 48′ and 49′; these setting wheels are rotatably mounted on an arbor 51 which is carried by two brackets 52 on the pressure beam 80. An opening 53 in a cover member 54 which closes the opening 55 in the casing wall 1 giving access to the impression mechanism, allows to see the setting wheels from the exterior. The impression wheels 45 and 46 serve for impressing the day of the month on the ticket; the teeth of the wheel 45 accordingly carry in successive relation the numbers 1, 2 and 3 necessary for impressing the tens, while the teeth of the wheel 46 carry the numbers 0 to 9. The teeth of the wheel 47 carry the numbers corresponding to the months 01 to 12, and the teeth of the wheel 48 carry numbers for impressing the year, for instance 48, 49, 50 etc. The teeth of the wheel 49 carry each a number, a letter or a particular sign each of which signs forming an identification mark of one of the various clerks of a ticket issuing office engaged in operating the apparatus. The faces of the teeth of the setting wheels 45'—49' carry the same numbers or signs as the corresponding impression wheels 45—49, and are so arranged that one face of each wheel can be seen through the opening 53. The relative position of the corresponding setting and impression wheels is such that when the number to be impressed appears on the tooth face which is visible through the opening 53 on the setting wheel, this same number will then appear on the lowermost tooth of the impression wheel above the impression layer 72 made of hard bronze which is inserted into the table 56 on which the ticket is laid.

For setting the impression wheels a sliding shaft 57 is mounted in a bore of the front wall 1 of the casing so as to be rotatable and axially slidable. The shaft 57 carries two diametrically opposite setting pins 58 which upon rotation of the shaft engage in turn with the teeth of one of the setting wheels 45'—49' and at each one half revolution of the shaft 57 advance the corresponding wheel through one tooth, and owing to the interengagement with the corresponding impression wheel, this latter is also advanced through one tooth. A sleeve 59 surrounds the shaft 57 and is provided with slots 60 through which penetrate the setting pins 58 of the shaft 57. The sleeve 59 accordingly turns with the shaft but cannot slide axially. A curved resilient cam disc 61 is placed over the sleeve 59 and is maintained on the sleeve by means of one or several annular coiled spring elements 62. A pin 63 fixed to the sleeve 59 prevents a rotation of the cam disc 61 relative to the sleeve and the shaft 57. The cam disc is provided with five notches 64 which are situated each in the plane of one of the setting wheels 45' to 49' and which are adapted to engage with the setting pin 58 when the shaft 57 is axially displaced. For setting each single wheel, the shaft is axially moved to bring the pin 58 in engagement with that notch which is disposed above the wheel to be set. A number of openings 65 in the cover 54 allow to see the position of the pin 58. Afterwards the shaft 57 is turned so that one of the pins 58 engages with the teeth of the corresponding wheel (Fig. 23) and at each one half revolution of the shaft the setting wheel is advanced through one tooth and the same advancing movement is imparted to the impression wheel.

The pressure beam 80 carries a bracket 66 to which is articulated at 67 a lever 68. The end 69 of this lever carries a retaining pin 70 (Figs. 5, 22 and 23) which extends over the width of the five impression wheels. A spring 71 is lodged in the pressure beam 80 and acts on the lever 68 so as to tend to rotate this latter in clockwise direction in Figs. 22 and 23 and to bring the retaining pin 70 into engagement with a tooth space of all five impression wheels, so that the wheels are maintained in their exact position during the impression operation, in which the tooth with the number to be impressed is situated exactly above the plate 72 in the table 56. The lever 68 is provided with an extension 73 situated laterally of the setting wheel 45' on the level of the uppermost tooth. When a setting wheel is adjusted by rotation of the shaft 57 one of the two cams 74 which are carried by the sleeve 59 acts against the extension 73 and rocks the lever 68 against the action of the spring 71 into the position according to Fig. 23 in which the retaining pin 70 releases the impression wheels so that they can rotate into the desired position. Each impression wheel coacts with a separate blade spring 75 which exerts a braking action against a periphery of the wheel to prevent a rotation of any of the other wheels, for example by friction when one of the wheels is set. Instead of punching the date on the ticket which is being issued and the number of the operator, these numbers could also be applied for example by ink on the ticket by means of printing rollers.

The severing knife 82 secured to the pressure beam 80 is provided with a slightly inclined cutting edge 76 (Figs. 5, 22, 23) which cooperates with the edge of the table 56 in order to sever the control stub 78 immediately at the rear of the place of impression of the date when the pressure beam 80 moves downwardly. The pressure beam 80 carries a stamp 83 which simultaneously with impressing the date on the issued ticket impresses thereon a particular safety sign so as to be able to recognize forged tickets.

Figure 5:
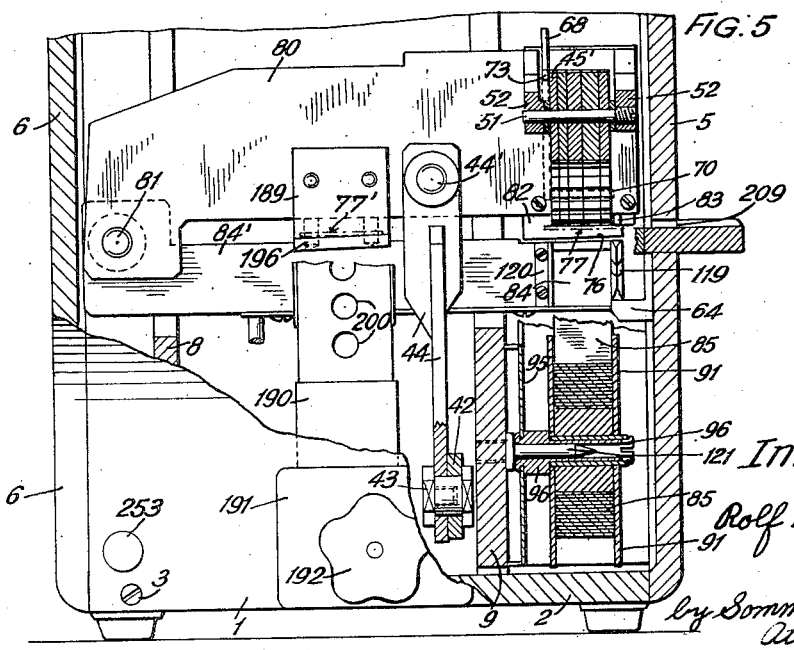
Fig. 5 is a vertical section along the line V—V of Fig. 3.
Figure 6:
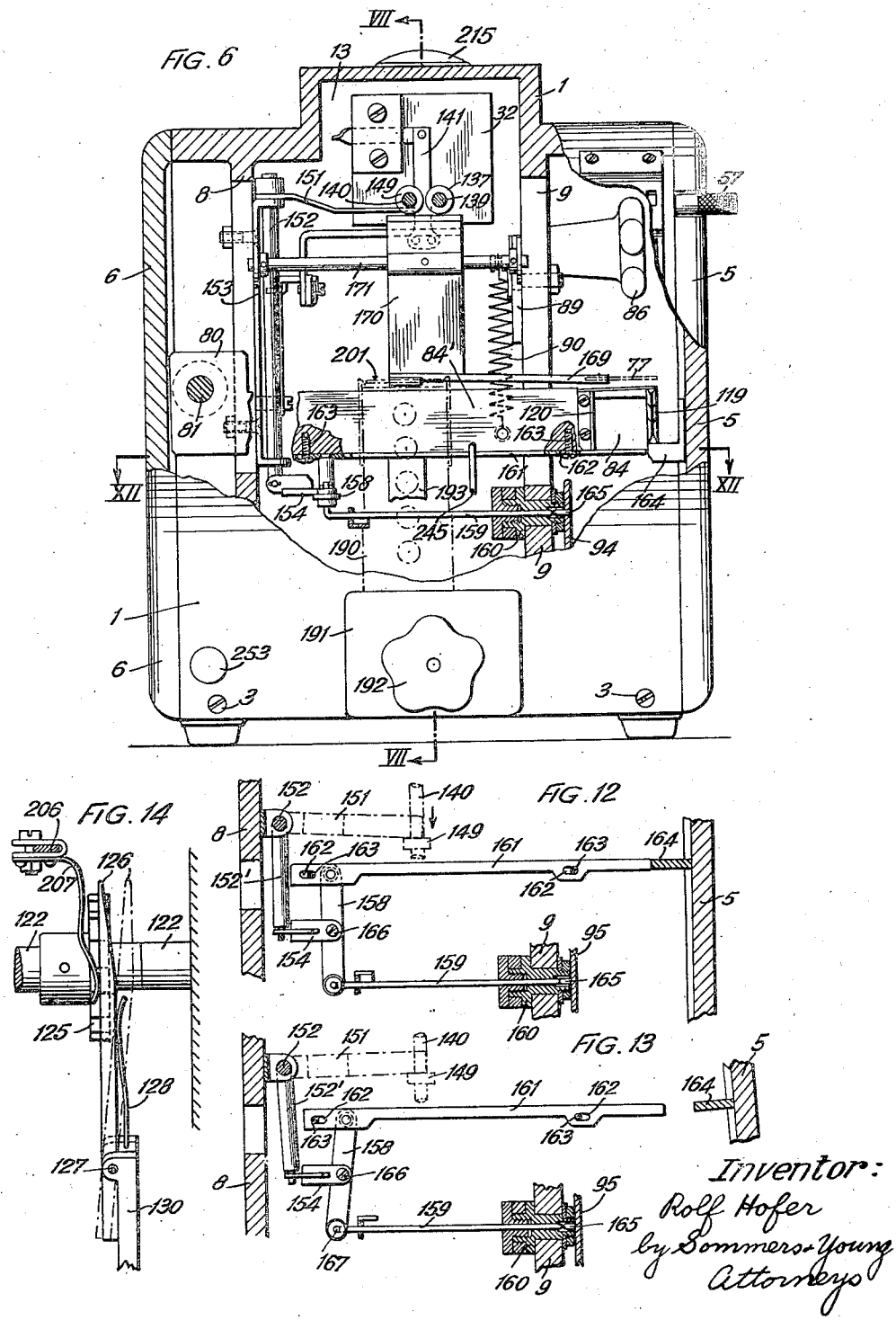
Fig. 6 is a vertical section along the line VI—VI of Fig. 7.

When the severing knife 82 is pressed downwardly together with the pressure beam 80 a control stub 78 is severed from the ticket 77 and is applied by the lower face of the severing knife against the top face of a sticking table 84 over which is guided an adhesive tape 85. The sticking table 84 is formed at the free end of a beam 84' which is pivotally mounted on the same pin 81 as the pressure beam 80 (Fig. 5). A handle 86 is rotatably mounted in the partition wall 9 and can be operated when the door 5 is open (Figs. 6 and 17). A cam 87 is secured to the axis of the handle at the inside of the wall 9 in the chamber 13, this cam cooperating with one end of a lever 89 pivoted at 88. A tension spring 90 is attached to the other end of the lever and is connected to the beam 84' carrying the sticking table. In the position shown in dotted lines in Fig. 17 the cam 87 releases the end of the lever. The other end of the lever, connected with the spring 90, is pulled downwardly by the action of the spring, while the beam 84' pivoted at 81, moves downwardly by its proper weight or under the action of a spring so that the sticking table 84 will be in its lowered position shown in Fig. 17. When the handle 86 is turned in clockwise direction, the cam 87 acts on the end of the lever 89 and brings this latter to the position shown in dash-and-dot lines. The opposite end of the lever is raised, and the spring 90 is tensioned so that the beam 84' is drawn upwardly and brings the sticking table 84 into operating position shown in Figs. 22 and 23.

The adhesive tape 85 is wound up on a supply roll 91 carried by a wall extension 95 of a box 92 which is removable from the apparatus. This box (Figs. 17 to 21) is made of sheet material and forms a casing having a cover 93 which can be locked. The rear wall 94 of the box is provided with the extension 95 to which is secured a sleeve 96 carrying the supply roll 91 which is situated outside of the casing 92. The adhesive tape 85 is passed from the supply roll into the interior of the box and about a driving cylinder 97. This cylinder is provided with a rubber coating 98 (Fig. 4) and a hollow sleeve 99 integral with a driving disc 100. A ratchet wheel 101 is secured to the cylinder 98 and cooperates with a retaining pawl 102 (Fig. 17) which prevents rotation of the cylinder in a direction opposite to the tape advancing movement. From the cylinder 97 the adhesive tape is passed around a pressure cylinder 103 which is applied by a spring 104 towards the cylinder 97 and from there the tape passes to a receiving roll 105 on which the tape carrying the severed control stubs 78 stuck thereon is wound up. The axis of the pressure cylinder 103 is carried by an arm 106 which penetrates through a slit 108 in the wall of the box (Figs. 20, 21) and which is rotatably mounted on an axis 107 carried by the wall extension 95. A second arm 109 which carries the axis of the pressure cylinder 103 is provided with a bent up end portion 110 against which acts the spring 104 which tends to urge the cylinder upwardly against the advancing roll. For placing the adhesive tape in position from the supply roll 91 about the driving cylinder 97 and the pressure cylinder 103 and for attaching the beginning of the tape to the receiving roll 105, the pressure cylinder must be removed from the driving cylinder. When the cover 93 of the box is opened and the pressure cylinder together with the arm 106 is pushed downwardly, the edge of the arm acts against a nose 111 of a pawl 112 (Figs. 20, 21) which is rotatably mounted on the axis 113 carried by the wall of the box, and brings this pawl into engagement with the arm 106 which is maintained against the action of the spring 104 in the position shown in dash and dot lines in Fig. 18. The adhesive tape can now be passed around the cylinders. In this removed position of the pressure cylinder 103, the bent up end portion 110 of the arm 109 arrives in the position according to Fig. 21 in which this end portion 110 prevents the closure of the cover member 93, because the lock 114 of the cover abuts against the end portion 110. Only when the pressure cylinder 103 has been pivoted back into its operative position in which it applies the adhesive tape against the driving cylinder 97, the cover 93 of the box can be shut. The return of the pressure cylinder is effected by exerting pressure on the bent up end 115 of the pawl 112 in order to rock the pawl and release the arm 106, so that the cylinder 103 turns back under the action of the spring 104 towards the driving cylinder. The cover 93 can now be closed and locked (Fig. 20) and the key 116 is removed from the lock so that no unauthorised person can have access to the interior of the box and accordingly to the tape carrying the control stubs and being wound up on the receiving roll 105 during operation of the apparatus. When the key 116 has been removed the door 5 of the main casing can be closed which is also necessary for the operation of the apparatus.

A brake 118 is applied by a spring 117 (Fig. 17) against the supply roll 91. When the pressure cylinder 103 is removed from the driving cylinder 97, the brake 118 is released at the same time by the arm 106 pivoting downwardly so that the adhesive tape 85 can be pulled off the supply roll and passed over the sticking table 84 to be attached to the receiving roll 105. The sticking table comprises two lateral guides 119 and 120 (Figs. 5, 6, 17) for the adhesive tape. After having passed the tape over the sticking table in its lower position and about the cylinders 97 and 103, and after attaching it to the receiving roll 105, the handle 86 is turned in clockwise direction in Fig. 17. The cam 87 acts then against the lever 89 and raises the end of the lever which is connected by means of the spring 90 with the beam 84, so that the spring will be tensioned and the beam is pulled upwardly to bring the sticking table in its position of operation just beneath the severing knife edge 76, in which position a severed control stub can be stuck to the tape by the lower end of the knife 82.

The box 92 is maintained in the chamber 14 of the casing by means of two pins 121 and 122 (Figs. 4 and 5). The pin 121 is secured to the wall 9 and serves to receive the sleeve 96 of the supply roll 91. The pin 122 is rotatably mounted in the wall 8 and extends with its forward end into a coupling sleeve 123 which is rotatably mounted in the wall 9 by the intermediary of a ball bearing. This sleeve carries a coupling disc 124 on the side of the wall 9 facing the box 92, and this disc 124 carries a number of coupling pins which penetrate into corresponding holes provided in the driving disc 100 of the cylinder 97, when the sleeve 99 of this cylinder is placed on the pin 122. This pin rotates together with the sleeve 123 and carries a ratchet wheel 125 (Figs. 3, 4, 14), which cooperates with a driving pawl 126. The driving pawl is pivotally mounted on an axis 127 so as to be able to tilt in a direction which is perpendicular to the plane of the wheel 125, and normally a blade spring 128 maintains the pawl in the plane of the wheel. The axis 127 is mounted on a bracket 130 which can pivot about a pin 129 carried by the lever 42, while a spring 131 tends to turn the bracket 130 and to hold the pawl 126 in engagement with the teeth of the ratched wheel 125. Each time when the circuit of the driving electro-magnet 15 is opened and the armature 17 is pulled upwardly by the action of the spring 79 the lever 42 also swings upwardly and moves the pawl 126 which turns the ratched wheel 125 through one tooth. The pin 122 and the coupling sleeve 124 accordingly effect a small angular movement by which the cylinder 97 of the adhesive tape is advanced. The cylinder carries outside of the gear wheel 101 a circular disc 132 having its circumference provided with a groove receiving a flexible driving member 133 for transmitting the movement of rotation of the cylinder to the receiving roll 105. This driving member is preferably formed by a helically coiled steel belt.

It has been seen that the driving magnet, when energised, causes the pressure beam 80 and the severing knife 82 to swing downwardly, and at the same time the control stub 78 severed by the knife from the ticket is pressed on the tape 85 and stuck thereon while the tape passes over the table 84. When afterwards the pressure beam and the severing knife move upwardly, the ratchet wheel 125 is operated at the same time and the driving cylinder 97 is turned, while also the receiving roll 105 is moved by the driving member 133 and the tape is wound up and advanced over the table 84, so that a fresh portion of tape is ready above the table to receive the successively severed stub. Since the diameter of the receiving roll increases when the winding of the tape progresses and the angular distance traversed by the tape becomes greater when the angular rotation of the roll remains constant, or when inversely a smaller angular rotation is necessary in order to advance the tape through the same distance, a helically coiled elastic steel belt 133 is used as driving connection between the cylinder 97, which constantly rotates through the same amount, and the receiving roll 105, so as to compensate the unequal angular rotations of the cylinder 97 and the roll 105.

It is visible from Figs. 17 and 18 that the three stubs 78 which are the last having been stuck on the tape 85 are still accessible outside of the box 92 before disappearing within the box when the tape is advanced. In order to prevent removal of these stubs or replacement of them by other stubs for the purpose of fraudulently modifying the control record of the issued tickets, provision is made that the box 92 will be accessible, and removable from the apparatus only after the cylinder 97 has been advanced through a sufficient angle that all stubs 78 on the tape 85 disappear in the interior of the box.

For this purpose provision is made that the lateral door 5 of the apparatus can be opened only after this advance of the tape has been effected. First it is necessary to open the lateral door 6 and to swing a manually operated lever 215 downwardly before the door 5 can be opened (Figs. 4, 35, 36). The lever 215 is fixed to a sleeve 216 which is loose on the pin 122 and engaging a further loose sleeve 217; this sleeve 217 has an extension 218 which carries a driving pawl 219 cooperating with the ratchet wheel 125. The sleeve 217 further carries an arm 220 which is connected by a rod 221 to an extension 222 of a cam sleeve 223 (Fig. 37). The connection of the arm 220 with a rod 221 is made by means of a pin 224 engaging a slot 225 provided in the rod. The cam sleeve 223 is loose on a rod 226 which is slidable between the walls 8 and 9. A pin 227 of the rod 226 is engaged in a V-shaped cam notch 228 of the sleeve 223 and is constantly applied by the spring 229 into this notch. The rod 226 is connected to one end of a lever 230 pivoted on a screw pin 231 in the front wall 1 of the casing; the other end of the lever carries a hook 232 which engages a projection 233 of the door when this latter is closed and maintains the door in closed position.

In order to remove the box 92 from the apparatus, the door 5 must be opened; first however, the door 6 must be opened and the lever 215 must be rocked by hand. The door 6 is opened by exerting a pressure on the latch 253 in the wall 1 of the casing (Fig. 16). When this latch is pushed inwardly, the head 254 of a pin 255 carried by the door 6 and traversing the latch 253 is released and the door 6 can be opened. Now, the lever 215 is actuated and accordingly the driving pawl 219 is operated and the ratchet wheel 125 turned through a corresponding angle to impart by the intermediary of the shaft 122 a sufficient angular movement to the cylinder 97 in order to advance the tape 85 sufficiently so that all stubs 78 disappear into the interior of the box 92.

When the sleeve 217 and the pawl 219 are turned, the pin 224 of the arm 220 has been moved to the opposite end of the slot 225 without moving the rod 221. After having first moved the ratchet 125 and the tape driving cylinder 97 the further pivoting movement of the lever 215 causes the pin 224 to move the rod 221 and to thereby turn the cam sleeve 223. The V-shaped cam accordingly moves the pin 227 with the rod 226 towards the right in Fig. 37 so that the lever 230 is pivoted and the hook 232 released from the projection 233. The door 5 can now be opened and the box 92 can be removed from the chamber 14. When the door 5 is closed again, the hook 232 snaps by itself behind the projection and the spring 229 moves the cam sleeve 223, and by the intermediary of the rods 222, 221 and 220, also the pawl 218 back into the position of rest.

Fig. 2 shows that the circuit of the driving magnet 15 is controlled by two switches, a main switch 134 and an auxiliary switch 135. The main switch 134 is closed when introducing a ticket into the apparatus for having the date impressed thereon and the stub 78 severed; opening of the switch 134 is automatically effected by the armature pull rod 19, as will be described later, shortly before the armature 17 has reached the end of its energising stroke. In order to close the circuit by operation of the switch 134, it is however necessary to first close the auxiliary switch 135, and this switch can be closed only when the apparatus is completely ready for operation.

The resilient switch arm 135 which is carried by an insulating member 136 (Figs. 3 and 7) is connected in any convenient manner to the current supply. As long as the apparatus is not ready for operation the contact arm 135 is held in position of rest by collars 137 and 138 which are adjustably fixed on locking rods 139 and 140, so as to be separated from the contact 141. The two locking rods 139 and 140 are mounted with one end in the front wall 1 of the casing and with the other end in the bracket 32. In contact locking position the two rods are engaged with their ends in openings 142 and 143 of the plate 28 which is carried by the armature pull rod 19 and prevent operation of the armature, even if the magnet circuit could be closed or if it would be tried to push the armature downwardly by hand, acting on the knob 150 (Fig. 3).

The rod 139 is locked against sliding movement by a cam 144 of a lock 145 mounted in the wall 1 of the casing (Fig. 10). The release of this rod 139 can only be effected by introducing a key 146 into the lock and by turning the cam to the position shown in Fig. 3, whereafter a spring 147 pushes the rod towards the left in Fig. 10 so that the rear end of the rod releases the plate 28, while at the same time the collar 137 is withdrawn from the contact arm 135. However, in order to release the contact arm 135, also the rod 140 carrying the collar 138 must be moved towards the left into the position shown in Fig. 8. The locking rod 140 is also mounted with one end in the wall 1 of the casing and with the other end in the bracket 32 and engages with this latter end the plate 28 on the pull rod 19. A spring 148 inserted between the wall 1 and a collar 149 on the rod 140 tends to maintain the rod 140 in its locking position according to Fig. 7. A switch arm 151 is fixed to a vertical shaft 152 and abuts with its free end against the collar 149 of the locking rod 140 (Figs. 6, 8, 12 and 13). The shaft 152 is rotatably carried by a bracket 153. The lower end 152' of the shaft 152 is bent at right angles and connected by means of a link 154 with a lever 158. One end of this lever is connected to a push rod 159 the free end of which traverses a plug 160 inserted into the wall 9 so as to be accessible from the chamber 14 of the casing which serves to receive the tape carrying box 92. The other end of the lever 158 is rotatably connected to a slide 161 which is carried by the lower side of the beam 84' by means of screws 163 penetrating through slots 162 in the slide. The lateral door 5 is provided with an abutment 164 which, when the door is closed, acts against the end of the slide 161 and maintains this latter in its position represented in Fig. 12 in which the slide is displaced towards the left. The wall extension 95 of the box 92 carries a pin 165 which, when the box is placed into its position in the chamber 14, penetrates into the plug 160 and acts against the end of the push rod 159 traversing the plug (Figs. 12, 13) in order to hold this rod also in its position in which it is pushed towards the left.

When the door 5 is open, or when the box 92 is removed from its position, the pivot 166 of the lever 158 can move towards the right in Fig. 13 and the shaft 152 is urged by the spring 148 (Fig. 7) acting against the collar 149 by the intermediary of the arm 151, into the position according to Fig. 13 in which the end 152' of the shaft is rocked towards the right and has moved the lever 158 also towards the right, while the locking rod 140 is in its locking position and engages the plate 28. When now the box 92 is inserted, the pin 165 acts against the push rod 159 and causes the lever 158 to turn about the pivot 166 into the position according to Fig. 13, since the slide 161 is free and can move towards the right until the screws 163 abut against the left end of the slots 162. When now the door 5 is closed the abutment 164 acts against the slide 161; the lever 158 is now maintained at the axis 167 since the rod 159 abuts against the pin 165 of the box wall 95; the axis 167 therefore forms the pivot of the lever 158 for the movement imparted to the lever by the slide 161 when the cover 5 is closed. The pivot 166 accordingly moves towards the left and the link 154 rotates the shaft 152 while this latter rocks the arm 151 which moves the locking rod 140 against the action of the spring 148 towards the left into the position according to Fig. 8. The collar 138 moves with the rod 140 and releases the switch arm 135. When now the locking cam 144 is removed from the collar 139' of the rod 139, both rods 139 and 140 are released from engagement with the plate 28 of the armature pull rod 19 and both contacts 135 and 141 have been closed. The armature 17 can now be pulled into the magnet coil when the magnet is energised by closure of the main switch 134.

The closure of the main switch 134 is automatically effected when a ticket 77 which is to be sold is inserted into the slot opening 168 above the table 56 for the purpose of impressing the date on the ticket. The edge of the ticket abuts then against one end of an arm 169 of a releasing lever 170 (Figs. 7, 16) which is rotatably mounted on an axis 171. As long as the two locking rods 139 and 140 are maintained in their locking position the upper end 172 of the lever 170 (Fig. 7) abuts against the collars 173 and 174 on the locking rods so that the lever cannot rock when the ticket is inserted in the slot 168; accordingly the main switch 134 cannot be closed as long as the two locking rods 139 and 140 are not released.

The lever 170 carries a cam plate 175 (Figs. 7 and 8) engaging a projection 176 of an arm 177 which is rotatably mounted at 178. This arm 177 is connected by means of a rod 179 with a switch lever 180 which carries one of the contacts of the main switch 134 and which is rotatably mounted at 181. A tension spring 182 connects the switch lever 180 with the releasing lever 170 and tends to maintain the lever 170 in the position shown in Fig. 7, even when the collars 173 and 174 are moved towards the left upon release of the locking rods 139 and 140. When the ticket is inserted into the slot opening 168 and abuts against the arm 169 of the lever 170, this lever is moved in counterclockwise direction into the position according to Fig. 8. A pawl 183 cooperates with the projection 176 of the arm 177; this pawl in the position according to Fig. 7 is applied under spring action from beneath against the projection 176. When the releasing lever 170 is rocked into the position according to Fig. 8, the cam plate 175 also rocks upwardly and releases the projection 176 on the arm 177. The switch lever 180 subjected to the action of the spring 182 is now suddenly rocked in counterclockwise direction, since the projection 176 can slide over the pawl 183, and the contacts of the main switch 134 carried by the switch lever are applied against the fixed contacts 184 (Fig. 8) and close the circuit of the driving magnet 15. The armature 17 is attracted and causes actuation, in the manner already described, of the movement transmission members 35, 38, 40, 42, of the pressure lever 80 for impressing the date on the ticket which is introduced through the slot 168, and also of the severing knife 82 for severing the control stub 78 and for applying this latter to the adhesive tape 85.

A moment before the armature arrives in its lowermost position at the end of its attractive stroke, the main switch 134 is opened by the pull rod 19 and the magnet circuit is again interrupted. For this purpose the pull rod 19 comprises a plate 185 of adjustable position and provided with a projecting portion 186 (Figs. 4 and 11). The projecting portion 186 engages the end of the contact carrying switch lever 180 just before the armature reaches its lowermost position and causes a pivoting movement of this lever in clockwise direction so as to effect a sudden separation of the contacts. The magnet circuit is now interrupted and the apparatus is in this moment in the position represented in Fig. 3. By the action of spring 79 the armature is raised and returned to its position of rest. This movement also causes the lever 42 to be moved upwardly in Fig. 3, so as to return the pressure beam and the severing knife 82 to their position of rest. The driving pawl 126 carried by the plate 130 is also pushed upwardly by the lever 42 and drives the ratchet wheel 125 and accordingly the tape advancing cylinder 97 in the box 92 through one step. The adhesive tape 85 having received a control stub 78 at the downward stroke of the armature is now advanced by movement of the receiving roll 105 and a fresh portion of tape is pulled above the table 84 to be ready for receiving the stub to be severed from the next following ticket which is issued.

When the main switch 134 is opened and the switch lever 180 rocked in clockwise direction, the arm 177 is returned by the rod 179 into its position shown in Fig. 7 while at the same time the spring 182 is tensioned and returns the releasing lever 170 also into the position shown in Fig. 7 in which it can be operated again by the next following ticket to be issued. The projection 176 of the arm 177 has been pulled out of the pawl 183 and the cam 175 has been returned together with the releasing lever 170 into the position according to Fig. 7. All parts of the apparatus for impressing the date and for severing a control stub and sticking the stub on the adhesive tape are now again ready for operation when issuing a further ticket, and when the armature is attracted and moves downwardly upon closure of the magnet circuit, the driving pawl 126 is made to engage the next following tooth of the ratchet wheel 125.

The described apparatus also effects automatically the control of tickets issued for half rate. The half rate tickets are not always reprinted for all courses, but they are frequently obtained by cutting off a portion of a usual full rate ticket by hand. When issuing a ticket in the manner described the severed stub indicates the full fare; provision must therefore be made to obtain a record of tickets sold at half rate. For this purpose means are provided to sever a second stub from a ticket to be sold at half rate after the first stub 78 has been cut off in the described manner and to collect this second stub on which also the price of the full rate ticket is printed. When the subsequent control and accounting of the tickets sold by a booking office clerk is effected, the price of the collected stubs of the tickets which have been sold for half rate is summed up and one half of the total sum is deducted from the total price of all issued tickets appearing on the wound-up record of stubs 78 stuck to the adhesive tape 85.

For severing the stubs of tickets sold for half rate a second table 187 is provided laterally of the table 56 and a slot opening 188 above the table 187 allows the introduction of the tickets 77' for the purpose of severing the second stub (Figs. 7, 8, 15, 16). A second severing knife 189 fixed to the pressure beam 80 cooperates with the edge of the table 187. For collecting the severed stubs there is provided a receptacle 190 which is placed into a drawer 191 situated below the table 187 and arranged to be drawn out of the apparatus by means of a knob 192. The receptacle 190 is maintained in the drawer by a spring 193 fixed to the table 84 and is inserted with its upper end between the beam 84' and the table 187 and guided by a setting screw 194. When severing a stub 195 (Fig. 9), this latter is immediately pressed downwardly by means of two pins 196 provided on the pressure beam, and inserted into the receptacle 190. A plate 197 in the receptacle carrying the stubs 195 is pressed upwardly by a spring 198. The stubs introduced into the receptacle are prevented from falling out through the open upper end by means of the inwardly projecting ends of two retaining springs 199. When a severed stub 195 is pressed into the receptacle these springs 199 are separated to let the stub pass into the interior of the receptacle. Holes 200 are provided in the wall of the receptacle permitting inspection to see if the receptacle is soon filled with stubs and must be replaced by an empty one.

For issuing a half rate ticket an ordinary full rate ticket 77 is introduced through the slot 168 into the device for impressing the date, in order to first apply the date to the ticket and to sever the control stub 78 and affix this latter to the adhesive tape 85, as has been described. Afterwards the ticket is withdrawn from the slot 168 and its opposite end 201 is now introduced into the opening 188 above the table 187. Again, the end of the ticket abuts against the releasing lever 170 and rocks this latter so that the main switch 134 is closed and the magnet circuit established. The armature 17 is attracted and the pressure beam 80 is lowered again. The severing knife 189 (Fig. 8) now cuts off a control stub 195 along the line 202 from the lower end of the ticket (Fig. 28) and the pins 196 on the beam press the stub into the receptacle 190.

When severing a stub 195 for half rate tickets, the date impressing device and the knife 82 are also lowered together with the pressure beam 80, but no stub 78 is severed at this time by the knife 82, nor stuck on the adhesive tape 85; provision is accordingly made that the driving cylinder 97 for the tape 85 is only moved when the date is impressed and a stub 78 for full rate tickets cut off, but not when a stub 195 is severed. A slide 203 is provided at the outside of the wall 1 of the casing between the two slot openings 168 and 188 for insertion of the tickets (Figs. 15 and 16). This slide can be horizontally moved to and fro on the wall 1 on which it is maintained by screws 205 penetrating a slot 204 of the slide. In Figs. 15 and 16 the slide 203 is represented in its left hand position in which position a ticket 77 can be inserted through the opening 168. In this position of the slide its left hand end slightly projects beyond the opening 188 so that no ticket may be inserted into this opening. In order to be able to sever a stub 195 for half rate tickets, it is necessary to first withdraw the ticket 77 from the opening 168, to turn the ticket and then insert it with its end 201 into the opening 188 whereby the slide 203 is moved towards the right. The opening 188 is in this manner exposed for insertion of a ticket, but the opening 168 will be obturated as is represented in dotted lines in Fig. 16. It is accordingly not possible to simultaneously insert tickets in both openings 168 and 188 and the operator of the apparatus is prevented from cutting off at the same time a stub 78 for full rate tickets and a stub 195 for half rate tickets.

In order to prevent an advance of the cylinder 97 when a control stub 195 for half rate tickets is severed, an arm 206 is provided on the slide 203 which arm penetrates through the wall 1 towards the interior of the casing and has attached to its free end a spring 207 (Fig. 14). The spring is applied against the driving pawl 126, and when the slide 203 is moved towards the right in Fig. 16 the pawl 126 is rocked about the axis 127 in order to be brought out of engagement with the ratchet wheel 125 as is indicated in dash-and-dot lines in Fig. 14. The pawl 126 moves together with the driving lever 42 when the driving magnet is energised but it does not advance the ratchet wheel 125 and accordingly the cylinder 97 does not move. When after issuing a half rate ticket a full rate ticket is sold again, the slide 203 moves towards the left when the ticket is inserted into the opening 168; the arm 206 with the spring 207 moves together with the slide and releases the pawl which is again brought into engagement with the ratchet wheel 125 by the spring 128.

Laterally of the table 56 the door 5 of the casing carries a further table 208 above which the door is provided with a slot opening 209 situated in the same plane as the slot opening 168 for the insertion of the tickets into the date impressing device. When tickets of a special size larger than the so-called Edmonson type tickets are to be sold, a latch 210 which forms the lateral guide for normal size tickets can be raised. It is then possible to insert below the latch 210 tickets which are larger than the guide slot between the slide 203 and the latch 210 through the slot openings 168 and 209 until their left hand edge abuts against the releasing lever arm 169, so that the main switch of the magnet circuit will be closed and the armature attracted to operate the pressure beam which causes the date to be impressed on the ticket while the severing knife lowering with the pressure beam cuts off a stub from the left hand corner of the inserted ticket and sticks it to the adhesive tape. When the ticket consists of an ordinary paper sheet which could not move the releasing lever 170 when it abuts against the end of the arm 169, it is possible to manually operate the lever 170 by means of a button 234 disposed below the table 208 on the door 5 (Figs. 15, 30, 31). When this button is pressed inwardly against a spring 235 it moves a rod 236 provided with an inclined surface 237. This surface acts against a piece of wire 238 which is hooked into the wall 9 and extends upwardly, so that upon rocking the wire its upper end presses against the arm 169 of the releasing lever 170 and causes this lever to pivot as described, in order to initiate the closure of the main switch 134 of the magnet circuit.

An incandescent bulb 211 (Fig. 2) is disposed in the electrical circuit of the apparatus which bulb is illuminated when the supply of adhesive tape on the supply roll 91 is soon exhausted, or when the receiving roll 105 is soon filled. The bulb is visible through a window 212 on the top of the apparatus. Laterally of the bulb is disposed a fuse 213 in the circuit.

The contact device for the bulb 211 is shown in Figs. 32 to 34. A feeler 239 is applied against the circumference of the tape supply roll 91 and is rigidly connected with a pressure arm 241 by the intermediary of an axis 240. A spring 242 tends to rock the pressure arm in counterclockwise direction in Fig. 32 and to maintain the feeler applied against the tape supply roll. When the tape supply decreases the feeler 239 moves inwardly towards the center of the roll until it arrives in the position which is represented in dash and dot lines, and the pressure arm 241 rocks correspondingly until its head 241' abuts against a spring contact 243 and moves this latter towards the complementary contact 244, whereby the circuit of the bulb 211 is closed and its illumination indicates to the operator of the apparatus that the supply roll must soon be changed.

In order that the feeler 239 does not interfere with the insertion of the roll 91, the pressure arm 241 is connected by a rod 245 with the beam 84' of the sticking table. When the beam 84', as has been described, is lowered by means of the knob 86 and the lever 89 (Fig. 17) in order to insert and pass the tape 85 above the table 84, the rod 245 acts against the arm 241 and lowers the feeler to its lowermost position which is represented in Fig. 32. When the sticking table is raised, the end of the rod 245 can slide in a slot 246 of the pressure arm 241 without moving this arm. This slot 246 is of such length that the arm 241, when the diameter of the supply roll decreases, can rock so far until it produces the closure of the contacts 243 and 244. These two contacts are also caused to close the circuit when the receiving roll 105 is almost full. A feeler 248 is rotatably mounted on an axis 247 disposed in the partition wall 9. This feeler extends over a disc of the roll 105 and makes contact with the tape collecting on this roll when the roll is almost filled. The other end of the lever 248 is connected with one end of a sliding rod 250 having other end supported in the wall 1 of the casing. The rod 250 carries an arm 251 which extends to the rear of the contact spring 244. When the roll 105 is soon filled, the wound-up tape acts against the feeler 248 and rocks this feeler in the direction of the arrow shown in Fig. 34. The end 249 pulls the rod 250 towards the right and the arm 251 applies the contact 244 against the contact 243, whereby the circuit of the bulb 211 is also closed and shows to the operator that the rolls of the box must be changed. A weak tension spring 252 maintains the feeler 248 in its position against the periphery of one of the lateral discs of the roll 105.

If for any reason no electrical current for energising the driving magnet should be available, the apparatus can also be operated by hand. For this purpose the cover 215 (Fig. 7) which during electric operation is inserted in the opening 214 of the top of the apparatus, is removed and replaced by a knob 159 which when not in use is stored in the chamber 12 of the apparatus (Fig. 4) where it can be inserted in a corresponding opening in the wall 8. Fig. 3 shows the knob 159 in operative position when it has been pressed down; it is provided with a pointed end 216' which penetrates into a corresponding recess in the upper edge of the plate 28 connected to the armature pull rod 19. When applying pressure on the knob, the plate 28 together with the armature and the guide rod 29 can be pressed downwardly so that the movement is transmitted to the pressure beam 80 in the same manner as though the magnet had been energised.

It is possible to connect the circuit of the electro-magnet 15 to the motor of an electric adding machine, so that, when prior to issuing a ticket, that is to say before impressing the date and severing a control stub, the price of a ticket is set up on the keyboard of the adding machine, the machine is released as soon as the circuit of the electro-magnet is closed by introducing the ticket into the date impression mechanism. In this manner it is possible, in addition to forming a record by the stubs of the sold tickets, to produce a further record of the received money by the control strip of the adding machine.

When the booking clerk who operates the apparatus has terminated his service, he removes the box 92 from the chamber 14 of the apparatus. He also pulls out the drawer 191 and takes out the receptacle 190 with the control stubs 195 of the tickets having been sold at half rate, and gives them together with the cash in his money box to the person which is charged with controlling the sale of tickets. This person can effect the control at any suitable time, that is to say he will open the cover 93 of the box and remove the wound-up tape with the stubs 78 from the receiving roll 105. Then the total amount of money received by the booking clerk is calculated by means of the ticket stubs 78 appearing on the tape and the ticket stubs 195 in the receptacle 190, and accounting is effected. The next following booking clerk who takes charge of the apparatus takes his own box 92 and introduces it in the described manner into the apparatus, he also inserts a new receptacle 190 in the drawer 191 and can then start with the sale of tickets.

The described apparatus is capable of considerable modification without in any manner departing from the spirit of my invention, and I do not wish to be understood as limiting myself to the specific construction herein illustrated except as hereinafter claimed.

I claim:

1. Apparatus for controlling tickets being issued comprising a casing, means in said casing for severing a stub from the ticket to be issued, a continuous tape adapted to pass beneath said stub severing means, means for successively attaching the severed stubs to said tape to obtain a record of the tickets having been issued, means for intermittently advancing said tape, means for simultaneously apposing the date of issue on the ticket being issued; a common driving member operative for actuating said stub severing means, said stub attaching means, said tape advancing means and said date apposing means, an electromagnet operatively connected to said driving member, an electric circuit therefor, contact means adapted to be actuated by a ticket inserted into the apparatus to close said circuit and energise the electromagnet, a tape carrier removably mounted in said casing, a locking member operative to prevent actuation of said common driving member and of said contact means when said tape carrier is removed from the casing, and means coacting with said locking member and said tape carrier for moving the locking means to release said driving member and said contact means when the tape carrier is mounted within the casing.

2. Apparatus as claimed in claim 1 and comprising an armature for said electromagnet, a lever transmission between the armature and said driving member, and means for manually actuating said driving member.

3. A ticket control apparatus comprising a casing, a pivotally movable pressure beam in said casing, means carried by said pressure beam for apposing the date of issue on the ticket being issued, a knife carried by said pressure beam for severing a stub from the ticket, said casing being provided with a slot opening for insertion of a ticket underneath said knife, a tape adapted to pass beneath said knife, means on said knife for successively applying each severed stub to the tape to obtain a continuous record of the tickets having been issued, a pivotally mounted driving member for actuating said pressure beam when moved in one direction and for advancing said tape when moving in the other direction, a second knife carried by said pressure beam in longitudinally spaced relation to said first mentioned knife, said second knife being adapted to sever a second stub from a ticket being issued, means below said second knife to collect the stubs severed thereby independently of the stubs severed by the first mentioned knife, said casing being provided with a second slot opening for insertion of a ticket underneath said second knife, and a slide mounted on the wall of the casing between said two slots, said slide being of a length greater than the interval between the two slots, whereby one slot opening is partially covered by the slide when the other slot opening is uncovered for insertion of a ticket.

4. Apparatus for controlling tickets being issued, comprising a casing, a pressure beam movable in said casing, means on said pressure beam for apposing the date on the ticket being issued, a knife carried by said pressure beam for severing a stub from the ticket being issued, a tape adapted to pass beneath said knife, means for successively attaching the severed stubs to said tape to obtain a record of the tickets having been issued, a supply roll for said tape, a driving cylinder engaging the tape, a receiving roll for winding up said record of issued tickets, a common driving member operatively connected to said pressure beam and to said driving cylinder for the tape, a second knife carried by said pressure beam in longitudinally spaced relation to said first mentioned knife, said second knife being adapted to sever a second stub from the ticket being issued, means below said second knife for collecting the ticket stubs severed thereby, said casing having slot openings for introducing a ticket to be issued underneath one of the other of said knives, and means actuated upon insertion of said ticket in the slot opening associated with said second mentioned knife to render inoperative the driving connection between said driving member and said tape driving cylinder.

5. Apparatus for controlling tickets being issued, comprising a casing, a pressure beam movable in said casing, means on said pressure beam for apposing data on the ticket being issued, a knife carried by said pressure beam for severing a stub from the ticket being issued, a tape adapted to pass beneath said knife, means for successively attaching the severed stubs to said tape to obtain a record from the tickets having been issued, a supply roll for said tape, a driving cylinder engaging the tape, a receiving roll for winding up said record of issued tickets, a common driving member operatively connected to said pressure beam and to said driving cylinder for the tape, a box removably mounted in said casing and carrying said tape supply roll, said driving cylinder and said receiving roll, a pressure roller adapted to apply the tape against the surface of the driving cylinder, a pivotally mounted supporting arm carrying said pressure roller, a cover member for said box adapted to be locked to render the record of the issued tickets inaccessible, said pressure roller being removable from said driving cylinder by a pivotal movement of said supporting arm when said cover is open, and means on said cover abutting against said supporting arm when the pressure roller is removed from the driving cylinder and permitting closure of the cover only when the pressure roller is applied on the driving cylinder.

6. Apparatus for controlling tickets being issued comprising a casing, means in said casing for severing a stub from the ticket to be issued, a continuous tape adapted to pass beneath said stub severing means, means for successively attaching the severed stubs to said tape to obtain a record of the tickets having been issued, means including a driving cylinder for intermittently advancing said tape, means for simultaneously apposing the date of issue on the ticket being issued, a common driving member operative for actuating said stub severing means, said stub attaching means, said tape advancing means and said date apposing means, an electromagnet operatively connected to said driving member, an electric circuit therefor, contact means adapted to be actuated by a ticket inserted into the apparatus to close said circuit and energise the electromagnet, a supply roll for said tape, a receiving roll for winding up said record of issued tickets, a box removably mounted within said casing and carrying said tape supply roll, said driving cylinder and said receiving roll, said box forming a chamber in which are mounted the driving cylinder and the receiving roll, means for locking said box to render the record of the issued tickets inaccessible to the person issuing the tickets, a locking member operative to prevent actuation of said common driving member and of said contact means when said box is removed from said casing, and means coacting with said locking member and said box for moving the locking means to release said driving member and said contact means when the box is mounted within the casing.

ROLF HOFER.

(References on following page)

References Cited in the file of this patent

UNITED STATES PATENTS

| Number | Name | Date |
|---|---|---|
| 1,078,861 | Koch | Nov. 18, 1913 |
| 1,273,390 | Lundgren et al. | July 23, 1918 |
| 1,378,887 | Martin | May 24, 1921 |
| 1,642,681 | Kaplan | Sept. 20, 1927 |
| 1,746,516 | Boyer | Feb. 11, 1930 |
| 1,868,997 | Speicher | July 26, 1932 |
| 1,981,199 | Ryan | Nov. 20, 1934 |
| 2,096,445 | Begun | Oct. 19, 1937 |
| 2,099,230 | Rix | Nov. 16, 1937 |
| 2,104,573 | Reinholdtsen | Jan. 4, 1938 |
| 2,111,057 | Swanson | Mar. 15, 1938 |
| 2,207,144 | Cooper | July 9, 1940 |
| 2,252,075 | Johnson | Aug. 12, 1941 |
| 2,351,281 | Nachemov | June 13, 1944 |
| 2,361,662 | Spurlino et al. | Oct. 13, 1944 |
| 2,400,510 | Hofer | May 21, 1946 |
| 2,422,143 | Somers et al. | June 10, 1947 |
| 2,444,685 | Waters | July 6, 1948 |
| 2,455,187 | Owens | Nov. 30, 1948 |